US010689086B2

(12) United States Patent
Stulc et al.

(10) Patent No.: US 10,689,086 B2
(45) Date of Patent: Jun. 23, 2020

(54) SPLICE JOINTS FOR COMPOSITE AIRCRAFT FUSELAGES AND OTHER STRUCTURES

(71) Applicant: The Boeing Company, Chicago, IL (US)

(72) Inventors: Jeffrey F. Stulc, Seattle, WA (US); Wallace C. Chan, Seattle, WA (US); Brian C. Clapp, Seattle, WA (US); Neal G. Rolfes, Seattle, WA (US)

(73) Assignee: The Boeing Company, Chicago, IL (US)

(*) Notice: Subject to any disclaimer, the term of this patent is extended or adjusted under 35 U.S.C. 154(b) by 387 days.

(21) Appl. No.: 15/459,810

(22) Filed: Mar. 15, 2017

(65) Prior Publication Data
US 2017/0183075 A1 Jun. 29, 2017

Related U.S. Application Data

(62) Division of application No. 14/525,218, filed on Oct. 28, 2014, now Pat. No. 9,738,371, which is a division
(Continued)

(51) Int. Cl.
B64C 1/06 (2006.01)
B64C 1/12 (2006.01)
(Continued)

(52) U.S. Cl.
CPC ............. B64C 1/069 (2013.01); B64C 1/068 (2013.01); B64C 1/12 (2013.01); B64C 1/1492 (2013.01);
(Continued)

(58) Field of Classification Search
USPC .......... 52/845, 848, 852; 244/119, 120, 131, 244/132
See application file for complete search history.

(56) References Cited

U.S. PATENT DOCUMENTS 2,004 A     3/1841  Harris
1,188,485 A * 6/1916 Pruyn ................... F16L 37/252
                                                    285/27
(Continued)

FOREIGN PATENT DOCUMENTS

DE    3040838 A1    5/1982
DE    3331494 A1    3/1985
(Continued)

OTHER PUBLICATIONS

NASA Contractor Report 178246, Contract NAS1-177701, 116 page PDF, Aug. 1988. (Year: 1988).*
(Continued)

Primary Examiner — Robert Canfield
(74) Attorney, Agent, or Firm — Yee & Associates, P.C.

(57) ABSTRACT

Structures and methods for joining composite fuselage sections and other panel assemblies together are disclosed herein. In one embodiment, a shell structure configured in accordance with the present invention includes a first panel portion positioned adjacent to a second panel portion. The first panel portion can include a first stiffener attached to a first composite skin, and the second panel portion can include a second stiffener attached to a second composite skin. The shell structure can further include a fitting extending across a first edge region of the first panel portion and a second edge region of the second panel portion. A first end portion of the fitting can be attached to the first stiffener and the first composite skin, and a second end portion of the fitting can be attached to a second stiffener and a second composite skin, to join the first panel portion to the second panel portion.

20 Claims, 8 Drawing Sheets

Related U.S. Application Data of application No. 13/300,487, filed on Nov. 18, 2011, now Pat. No. 8,882,040, which is a division of application No. 12/016,258, filed on Jan. 18, 2008, now Pat. No. 8,061,035, which is a division of application No. 10/949,848, filed on Sep. 23, 2004, now Pat. No. 7,325,771.

(51) Int. Cl.
    *B64C 1/14* (2006.01)
    *B64C 1/00* (2006.01)

(52) U.S. Cl.
    CPC ....... *B64C 2001/0072* (2013.01); *Y02T 50/43* (2013.01); *Y10T 29/49616* (2015.01); *Y10T 29/49622* (2015.01); *Y10T 29/49826* (2015.01); *Y10T 428/19* (2015.01); *Y10T 428/24331* (2015.01); *Y10T 428/24612* (2015.01); *Y10T 428/24628* (2015.01); *Y10T 428/24661* (2015.01)

(56) References Cited

U.S. PATENT DOCUMENTS

| | | | |
|---|---|---|---|
| 1,300,777 A * | 4/1919 | Reid | 244/119 |
| 1,370,288 A * | 3/1921 | Lawes | B23K 31/02 |
| | | | 52/459 |
| 1,976,257 A | 3/1930 | Harper, Jr. | |
| 1,922,063 A * | 8/1933 | Vaughn | B64C 1/061 |
| | | | 29/462 |
| 2,029,635 A * | 2/1936 | Ralson | B65G 15/48 |
| | | | 24/31 R |
| 2,254,152 A * | 8/1941 | Hanns | B64C 1/068 |
| | | | 244/119 |
| 2,292,372 A | 8/1942 | Gerlach et al. | |
| 2,367,750 A | 1/1945 | Mullen et al. | |
| 2,387,219 A | 10/1945 | Wallis | |
| 2,405,643 A | 8/1946 | Crot | |
| 2,639,788 A * | 5/1953 | Gustafson | B64C 1/06 |
| | | | 52/463 |
| 2,742,247 A * | 4/1956 | Lachmann | B64C 21/06 |
| | | | 244/130 |
| 2,992,711 A | 7/1961 | Mitchell et al. | |
| 3,071,217 A | 1/1963 | Gould | |
| 3,271,917 A | 9/1966 | Rubenstein | |
| 3,306,797 A | 2/1967 | Boggs | |
| 3,452,501 A | 7/1969 | Sickler et al. | |
| 3,490,983 A | 1/1970 | Lee | |
| 3,507,634 A | 4/1970 | O'Driscoll | |
| 3,603,096 A | 9/1971 | Wells | |
| 3,879,245 A | 4/1975 | Fetherston et al. | |
| 3,974,313 A | 8/1976 | Vamell | |
| 3,976,269 A | 8/1976 | Gupta | |
| 3,995,080 A | 11/1976 | Cogburn et al. | |
| 4,050,208 A | 9/1977 | Pompei et al. | |
| 4,064,534 A | 12/1977 | Chen et al. | |
| 4,086,378 A | 4/1978 | Kam et al. | |
| 4,186,535 A | 2/1980 | Morton | |
| 4,256,790 A | 3/1981 | Lackman et al. | |
| 4,310,132 A | 1/1982 | Robinson et al. | |
| 4,311,661 A | 1/1982 | Palmer | |
| 4,331,495 A | 5/1982 | Lackman et al. | |
| 4,331,723 A | 5/1982 | Hamm | |
| 4,410,577 A | 10/1983 | Palmer et al. | |
| 4,448,838 A | 5/1984 | McClenahan et al. | |
| 4,457,249 A | 7/1984 | Disen | |
| 4,463,044 A | 7/1984 | McKinney | |
| 4,490,958 A | 1/1985 | Lowe | |
| 4,492,607 A | 1/1985 | Halcomb | |
| 4,542,055 A | 9/1985 | Fitzsimmons | |
| 4,546,717 A | 10/1985 | Marchesi | |
| 4,548,017 A | 10/1985 | Blando | |
| 4,548,859 A | 10/1985 | Kline et al. | |
| 4,571,355 A | 2/1986 | Elrod | |
| 4,608,220 A | 8/1986 | Caldwell et al. | |
| 4,615,935 A | 10/1986 | Bendig et al. | |
| 4,622,091 A | 11/1986 | Letterman | |
| 4,631,221 A | 12/1986 | Disselbeck et al. | |
| 4,693,678 A | 9/1987 | Von Volkli | |
| 4,699,683 A | 10/1987 | McCowin | |
| 4,715,560 A | 12/1987 | Loyek | |
| 4,736,566 A | 4/1988 | Krotsch | |
| 4,760,444 A | 7/1988 | Nielson et al. | |
| 4,780,262 A | 10/1988 | Von Volkli | |
| 4,790,898 A | 12/1988 | Woods | |
| 4,811,540 A | 3/1989 | Kallies et al. | |
| 4,828,202 A | 5/1989 | Jacobs et al. | |
| 4,830,298 A | 5/1989 | Van Blunk | |
| 4,877,471 A | 10/1989 | McCowin et al. | |
| 4,941,182 A | 7/1990 | Patel | |
| 4,942,013 A | 7/1990 | Palmer et al. | |
| 4,959,110 A | 9/1990 | Russell | |
| 4,959,220 A | 9/1990 | Yamamoto et al. | |
| 4,966,802 A | 10/1990 | Hertzberg | |
| 5,024,399 A | 6/1991 | Barquet et al. | |
| 5,058,497 A | 10/1991 | Bishop et al. | |
| 5,086,997 A | 2/1992 | Glass | |
| 5,148,588 A | 9/1992 | Prillard | |
| 5,223,067 A | 6/1993 | Hamamoto et al. | |
| 5,240,376 A | 8/1993 | Velicki | |
| 5,242,523 A | 9/1993 | Willden et al. | |
| 5,251,849 A | 10/1993 | Torres | |
| 5,262,220 A | 11/1993 | Spriggs et al. | |
| 5,281,388 A | 1/1994 | Palmer et al. | |
| 5,297,760 A | 8/1994 | Hart-Smith | |
| 5,337,647 A | 8/1994 | Roberts et al. | |
| 5,384,959 A | 1/1995 | Velicki | |
| 5,399,406 A | 3/1995 | Matsuo et al. | |
| 5,429,326 A | 7/1995 | Garesche et al. | |
| 5,439,549 A | 8/1995 | Fryc et al. | |
| 5,450,147 A | 9/1995 | Dorsey-Palmateer | |
| 5,518,208 A | 3/1996 | Rosburg | |
| 5,540,126 A | 7/1996 | Piramoon | |
| 5,562,788 A | 10/1996 | Kitson et al. | |
| 5,619,837 A | 4/1997 | DiSanto | |
| 5,622,733 A | 4/1997 | Asher | |
| 5,651,600 A | 7/1997 | Dorsey-Palmateer | |
| 5,683,646 A | 11/1997 | Reiling, Jr. | |
| 5,700,337 A | 12/1997 | Jacobs et al. | |
| 5,746,553 A | 5/1998 | Engwall | |
| 5,765,329 A | 6/1998 | Huang | |
| 5,804,276 A | 9/1998 | Jacobs et al. | |
| 5,809,805 A | 9/1998 | Palmer et al. | |
| 5,814,386 A | 9/1998 | Vasiliev et al. | |
| 5,871,117 A | 2/1999 | Protasov et al. | |
| 5,893,534 A | 4/1999 | Watanabe | |
| 5,902,535 A | 5/1999 | Burgess et al. | |
| 5,915,317 A | 6/1999 | Thrash et al. | |
| 5,931,107 A | 8/1999 | Thrash et al. | |
| 5,951,800 A | 9/1999 | Pettit | |
| 5,953,231 A | 9/1999 | Miller et al. | |
| 5,954,917 A | 9/1999 | Jackson et al. | |
| 5,963,660 A | 10/1999 | Koontz et al. | |
| 5,979,531 A | 11/1999 | Barr et al. | |
| 6,003,812 A | 12/1999 | Micale et al. | |
| 6,012,883 A | 1/2000 | Engwall et al. | |
| 6,013,341 A | 1/2000 | Medvedev et al. | |
| 6,045,651 A | 4/2000 | Kline et al. | |
| 6,051,089 A | 4/2000 | Palmer et al. | |
| 6,070,831 A | 6/2000 | Vasiliev et al. | |
| 6,074,716 A | 6/2000 | Tsotsis | |
| 6,086,696 A | 7/2000 | Gallagher | |
| 6,098,928 A * | 8/2000 | Bross | F42B 15/36 |
| | | | 244/120 |
| 6,099,906 A | 8/2000 | Palmer et al. | |
| 6,112,792 A | 9/2000 | Barr et al. | |
| 6,114,012 A | 9/2000 | Amaoka et al. | |
| 6,114,050 A | 9/2000 | Westre et al. | |
| 6,128,545 A | 10/2000 | Miller | |
| 6,129,031 A | 10/2000 | Sarh et al. | |
| 6,136,237 A | 10/2000 | Straub et al. | |
| 6,155,450 A | 12/2000 | Vasiliev et al. | |
| 6,168,358 B1 | 1/2001 | Engwall et al. | |

(56) References Cited

U.S. PATENT DOCUMENTS

| | | | |
|---|---|---|---|
| 6,190,484 B1 | 2/2001 | Appa | |
| 6,198,983 B1 | 3/2001 | Thrash et al. | |
| 6,205,239 B1 | 3/2001 | Lin et al. | |
| 6,231,941 B1 | 5/2001 | Cundiff et al. | |
| 6,319,447 B1 | 11/2001 | Cundiff et al. | |
| 6,187,411 B1 | 12/2001 | Palmer | |
| 6,364,250 B1 | 4/2002 | Brinck et al. | |
| 6,374,750 B1 | 4/2002 | Early | |
| 6,390,169 B1 | 5/2002 | Johnson | |
| 6,415,581 B1 | 7/2002 | Shipman et al. | |
| 6,431,837 B1 | 8/2002 | Velicki | |
| 6,451,152 B1 | 9/2002 | Holmes et al. | |
| 6,480,271 B1 | 11/2002 | Cloud et al. | |
| 6,508,909 B1 | 1/2003 | Cerezo Pancorbo et al. | |
| 6,510,961 B1 | 1/2003 | Head et al. | |
| 6,511,570 B2 | 1/2003 | Matsui | |
| 6,547,769 B2 | 4/2003 | VanTassel et al. | |
| 6,560,843 B2 | 5/2003 | Cundiff et al. | |
| 6,561,478 B2 | 5/2003 | Cundiff et al. | |
| 6,589,618 B2 | 7/2003 | Cundiff et al. | |
| 6,613,258 B1 | 9/2003 | Maison et al. | |
| 6,620,484 B1 | 9/2003 | Bolukbasi et al. | |
| 6,622,974 B1 | 9/2003 | Dockter et al. | |
| 6,648,273 B2 | 11/2003 | Anast | |
| 6,663,737 B2 | 12/2003 | Hsiao et al. | |
| 6,692,681 B1 | 2/2004 | Lunde | |
| 6,702,911 B2 | 3/2004 | Toi et al. | |
| 6,709,538 B2 | 3/2004 | George et al. | |
| 6,730,184 B2 | 5/2004 | Kondo et al. | |
| 6,743,504 B1 | 6/2004 | Allen et al. | |
| 6,766,984 B1 | 7/2004 | Ochoa | |
| 6,779,707 B2 | 8/2004 | Dracup et al. | |
| 6,786,452 B2 | 9/2004 | Yamashita et al. | |
| 6,799,619 B2 | 10/2004 | Holmes et al. | |
| 6,802,931 B2 | 10/2004 | Fujihira | |
| 6,814,822 B2 | 11/2004 | Holmes et al. | |
| 6,817,574 B2 | 11/2004 | Solanille et al. | |
| 6,840,750 B2 | 1/2005 | Thrash et al. | |
| 6,860,957 B2 | 3/2005 | Sana et al. | |
| 6,871,684 B2 | 3/2005 | Engelbart et al. | |
| 6,896,841 B2 | 5/2005 | Velicki et al. | |
| 6,910,043 B2 | 6/2005 | Iivonen et al. | |
| 6,957,518 B1* | 10/2005 | Koch, Jr. | E04C 3/30 52/849 |
| 7,025,305 B2 | 4/2006 | Folkesson et al. | |
| 7,039,485 B2 | 5/2006 | Engelbart et al. | |
| 7,039,797 B2 | 5/2006 | Huang et al. | |
| 7,048,024 B2 | 5/2006 | Clark et al. | |
| 7,074,474 B2 | 7/2006 | Toi et al. | |
| 7,080,441 B2 | 7/2006 | Braun | |
| 7,080,805 B2 | 7/2006 | Prichard et al. | |
| 7,083,698 B2 | 8/2006 | Engwall et al. | |
| 7,093,797 B2 | 8/2006 | Grether et al. | |
| 7,134,629 B2 | 11/2006 | Johnson et al. | |
| 7,137,182 B2 | 11/2006 | Nelson | |
| 7,141,199 B2 | 11/2006 | Sana et al. | |
| 7,159,822 B2 | 1/2007 | Grantham et al. | |
| 7,167,182 B2 | 1/2007 | Butler | |
| 7,171,033 B2 | 1/2007 | Engelbart et al. | |
| 7,193,696 B2 | 3/2007 | Engelbart et al. | |
| 7,195,201 B2 | 3/2007 | Grether et al. | |
| 7,228,611 B2 | 6/2007 | Anderson et al. | |
| 7,236,625 B2 | 6/2007 | Engelbart et al. | |
| 7,278,198 B2 | 10/2007 | Olson et al. | |
| 7,282,107 B2 | 10/2007 | Johnson et al. | |
| 7,289,656 B2 | 10/2007 | Engelbart et al. | |
| 7,325,771 B2 | 2/2008 | Stulc et al. | |
| 7,334,782 B2 | 2/2008 | Woods et al. | |
| 7,384,663 B2 | 6/2008 | Olry et al. | |
| 7,407,556 B2 | 8/2008 | Oldani et al. | |
| 7,413,695 B2 | 8/2008 | Thrash et al. | |
| 7,503,368 B2 | 3/2009 | Chapman et al. | |
| 7,527,222 B2 | 5/2009 | Biornstad et al. | |
| 7,556,076 B2 | 7/2009 | Prost et al. | |
| 7,624,488 B2 | 12/2009 | Lum et al. | |
| 7,662,251 B2 | 2/2010 | Salaam et al. | |
| 7,716,835 B2 | 5/2010 | Johnson et al. | |
| 7,823,362 B2* | 11/2010 | Meyer | B64C 1/064 244/120 |
| 7,850,387 B2* | 12/2010 | Chapin | B64C 1/12 403/286 |
| 7,857,258 B2* | 12/2010 | Normand | B64C 1/069 244/120 |
| 8,056,297 B2* | 11/2011 | Mathai | E04H 12/08 403/292 |
| 8,061,035 B2 | 11/2011 | Stulc et al. | |
| 8,282,042 B2* | 10/2012 | Parikh | B64C 1/12 244/130 |
| 8,302,909 B2* | 11/2012 | Cazeneuve | B64C 1/06 244/120 |
| 8,480,031 B2* | 7/2013 | Gauthie | B64C 1/064 244/120 |
| 8,484,848 B2* | 7/2013 | Gallant | B29C 65/56 29/897.2 |
| 8,567,720 B2* | 10/2013 | Gallant | B64C 1/061 244/119 |
| 8,567,722 B2* | 10/2013 | Rosman | B64C 1/068 244/131 |
| 8,715,808 B2* | 5/2014 | Roming | B64C 1/064 428/136 |
| 8,777,159 B2* | 7/2014 | Cruz Dominguez | B64C 1/064 244/119 |
| 8,844,108 B2* | 9/2014 | Miller | B29C 73/04 29/402.08 |
| 8,869,403 B2* | 10/2014 | Stulc | B64C 1/069 29/897.2 |
| 8,876,053 B2* | 11/2014 | Moreau | B64C 1/064 244/131 |
| 8,882,040 B2 | 11/2014 | Stulc et al. | |
| 9,153,853 B2* | 10/2015 | Lassiter | H01Q 1/1242 |
| 9,187,167 B2* | 11/2015 | Sauermann | B29B 13/025 |
| 9,371,125 B2* | 6/2016 | Gallant | B64C 1/061 |
| 9,586,667 B2* | 3/2017 | Reeves | B64C 1/069 |
| 10,041,269 B2* | 8/2018 | Gremling | F03D 13/20 |
| 10,150,554 B2* | 12/2018 | Plokker | B29C 45/0005 |
| 10,308,342 B2* | 6/2019 | Staal | B64C 1/06 |
| 2003/0190455 A1 | 10/2003 | Burgess et al. | |
| 2004/0035979 A1 | 2/2004 | McCosky, Jr. et al. | |
| 2004/0071870 A1 | 4/2004 | Knowles et al. | |
| 2004/0219855 A1 | 11/2004 | Tstotsis | |
| 2004/0222080 A1 | 11/2004 | Tour et al. | |
| 2005/0059309 A1 | 3/2005 | Tstotsis | |
| 2005/0163965 A1 | 7/2005 | Velicki et al. | |
| 2005/0263645 A1* | 12/2005 | Johnson | B61D 17/041 244/119 |
| 2006/0071125 A1* | 4/2006 | Wood | B64C 1/12 244/119 |
| 2006/0118244 A1 | 6/2006 | Zaballos et al. | |
| 2006/0166003 A1 | 7/2006 | Khabasheku et al. | |
| 2006/0236648 A1* | 10/2006 | Grundman | E04C 3/30 52/848 |
| 2007/0128960 A1 | 6/2007 | Ghasemi Nejhad et al. | |
| 2008/0041009 A1* | 2/2008 | Cairo | E04H 12/08 52/651.07 |
| 2008/0105785 A1* | 5/2008 | Griess | B64C 1/068 244/120 |
| 2008/0111026 A1 | 5/2008 | Stulc et al. | |
| 2008/0246175 A1 | 10/2008 | Biomstad et al. | |
| 2008/0286564 A1 | 11/2008 | Tstosis | |
| 2009/0021019 A1* | 1/2009 | Thomsen | E04H 12/085 290/55 |
| 2009/0057487 A1 | 3/2009 | Velicki et al. | |
| 2009/0139641 A1 | 6/2009 | Chapman et al. | |
| 2009/0277994 A1* | 11/2009 | Lobato | B64C 1/061 244/119 |
| 2010/0044514 A1 | 2/2010 | Tacke | |
| 2010/0258676 A1* | 10/2010 | Gauthie | B64C 1/064 244/131 |
| 2010/0272954 A1* | 10/2010 | Roming | B64C 1/064 428/138 |
| 2010/0282905 A1* | 11/2010 | Cazeneuve | B64C 1/06 244/120 |

(56) References Cited

U.S. PATENT DOCUMENTS

| | | | |
|---|---|---|---|
| 2011/0042519 A1* | 2/2011 | Tacke | B64C 1/064 244/131 |
| 2011/0073708 A1 | 3/2011 | Biornstad et al. | |
| 2011/0138729 A1* | 6/2011 | Shiraishi | E04H 12/085 52/651.01 |
| 2011/0185555 A1* | 8/2011 | Gallant | B29C 65/56 29/428 |
| 2012/0025023 A1* | 2/2012 | Bernard | B64C 1/064 244/131 |
| 2012/0061512 A1 | 3/2012 | Stulc et al. | |
| 2012/0153082 A1* | 6/2012 | Rosman | B64C 1/068 244/120 |
| 2013/0181092 A1* | 7/2013 | Cacciaguerra | B64C 1/068 244/131 |
| 2013/0233973 A1* | 9/2013 | Nordman | B64C 1/26 244/131 |
| 2014/0001311 A1* | 1/2014 | Dopker | B64C 1/069 244/120 |
| 2014/0117157 A1* | 5/2014 | Diep | B64C 1/12 244/120 |
| 2014/0165361 A1* | 6/2014 | Stulc | B64C 1/069 29/428 |
| 2014/0166811 A1* | 6/2014 | Roming | B64C 1/061 244/131 |
| 2014/0224932 A1* | 8/2014 | Cardin | B64C 1/069 244/119 |

FOREIGN PATENT DOCUMENTS

| | | | | |
|---|---|---|---|---|
| DE | 4408476 A1 | * | 9/1995 | B64C 1/1492 |
| EP | 0319797 A2 | | 6/1898 | |
| EP | 0198744 A1 | | 10/1986 | |
| EP | 0833146 A2 | | 4/1998 | |
| EP | 1149687 A2 | | 10/2001 | |
| GB | 559954 A | * | 3/1944 | B64C 1/068 |
| GB | 2224000 A | | 4/1990 | |
| JP | 61169394 A | | 2/1988 | |
| JP | 05286493 A | * | 11/1993 | |
| JP | 2001310798 A | | 11/2001 | |
| WO | 9832589 A1 | | 7/1998 | |
| WO | 03035380 A1 | | 5/2003 | |
| WO | 2004025003 A2 | | 3/2004 | |
| WO | 2005101144 A2 | | 10/2005 | |

OTHER PUBLICATIONS

International Search Report and Written Opinion regarding Application No. PCT/US2005/032737, dated Dec. 19, 2006, 16 pages.
Ando et al., "Growing Carbon Nanotubes," Materials Today, Oct. 2004, pp. 22-29.
"A Barrelful of Experience", Interavia, May 1992, p. 36.
"Beechcraft's Composite Challenge", aerotalk.com, accessed Mar. 1, 2004, 2 pages.
"British Aerospace Aircraft: BAe 146", Flight International, May 1981, 2 pages.
"Business Aviation," Jun. 7, 2002, 2 pages. http://www..aviationnow.com/avnow/news/channel_busav.jsp?view=story&id=news/btoyo0607.xml.
"CNC fiber placement used to create an all-composite fuselage", Aerospace Engineering Online, Top 15 Technologies, SAE International, Oct. 2005, 2 pages. http://web.archive.org/web/20001005030853/http://www.sae.org/aeromag/techinnovations/1298t08.htm.
Evans, "Fiber Placement", ASM Handbook vol. 21: Composites, ASM International, 2001, pp. 477-479.
Fielder et al., "TANGO Composite Fuselage Platform", SAMPE Journal, vol. 39, No. 1, Jan./Feb. 2003, pp. 57-63.
"Filament Winding", Rocky Mountain Composites, 1 page, accessed Feb. 28, 2004 http://www.rockymountaincomposites.com/wind-sys.htm.
Garcia et al., "Hybrid Carbon Nanotube-Composite Architectures", MTL Annual Research Report, Sep. 2006, 1 page.
Grimshaw et al., "Advanced Technology Tape Laying for Affordable Manufacturing of Large Composite Structures", Proceedings of the 46th International SAMPE Symposium and Exhibition, May 2001, 11 pages.
Grimshaw, "Automated Tape Laying", ASM Handbook vol. 21: Composites, ASM International, 2001, pp. 480-485.
"Growing Carbon Nanotubes Aligned With Patterns," NASA's Jet Propulsion Laboratory, Oct. 1, 2002, 4 pages. http:www.nasatech.com/Briefs/Oct02/NPO30205.html.
International Search Report and Written Opinion regarding Application No. PCT/US2004/039905, dated May 25, 2005, 10 pages.
"The Longest Carbon Nanotubes You Have Ever Seen," Space Mart, May 14, 2007, 3 pages.
"Premier I Features Lighter, Strong All-Composite Fuselage", WolfTracks, vol. 4, No. 1, 1998, 3 pages.
"Raytheon Aircraft's Hawker Horizon Reaches Fuselage Milestone", Beechcraft/Raytheon News Release, Oct. 2000, 2 pages.
"Raytheon Aircraft Orders Four More Fiber Cincinnati Fiber Placement Systems for Industry's First Composite-Fuselage Business Jets", Cincinnati Machine News Releases, Jul. 2000, 2 pages.
"Raytheon's New Quiet Jets", Vibro-Acoustic Sciences Newsletter, vol. 4, No. 2, Mar. 2000, 2 pages.
Sharp et al., "Material Selection/Fabrication Issues for Thermoplastic Fiber Placement", Journal of Thermoplastic Composite Materials, vol. 8, Jan. 1995, 13 pages.
Velicki et al., "Damage Arrest Design Approach Using Stitched Composites," International Conference on Aircraft Structural Design, Oct. 2010, 9 pages.
"The Wondrous World of Carbon Nanotubes", Eindhoven University of Technology, Feb. 2003, 96 pages. http://students.chem.tue.nl/ifp03/synthesis.html.
Zhang, "Angewandte Sensorik" CH 4, Sensoren in der Robotik, XP002327793, Nov. 11, 2003, pp. 76-113. http://tech-www.informatik.uni-hamburg.de/lehre/ws2003/veriesungen/angewandte_sensorik/verlesung_03.pdf.
Office Action dated Sep. 28, 2006, regarding U.S. Appl. No. 10/949,848, 20 pages.
Notice of Allowance dated Aug. 14, 2007, regarding U.S. Appl. No. 10/949,848, 10 pages.
Notice of Allowance dated Mar. 16, 2011, regarding U.S. Appl. No. 12/016,258, 22 pages.
Notice of Allowance dated Jul. 19, 2011, regarding U.S. Appl. No. 12/016,258, 13 pages.
Notice of Allowance dated Mar. 11, 2014, regarding U.S. Appl. No. 13/225,057, 38 pages.
Office Action dated Mar. 11, 2014, regarding U.S. Appl. No. 13/300,487, 6 pages.
Notice of Allowance dated Apr. 9, 2014, regarding U.S. Appl. No. 13/300,487, 6 pages.
Notice of Allowance dated Jul. 10, 2014, regarding U.S. Appl. No. 13/300,487, 33 pages.
Office Action dated Jun. 27, 2016, regarding U.S. Appl. No. 14/525,218, 36 pages.
Notice of Allowance dated Nov. 4, 2016, regarding U.S. Appl. No. 14/525,218, 8 pages.

* cited by examiner

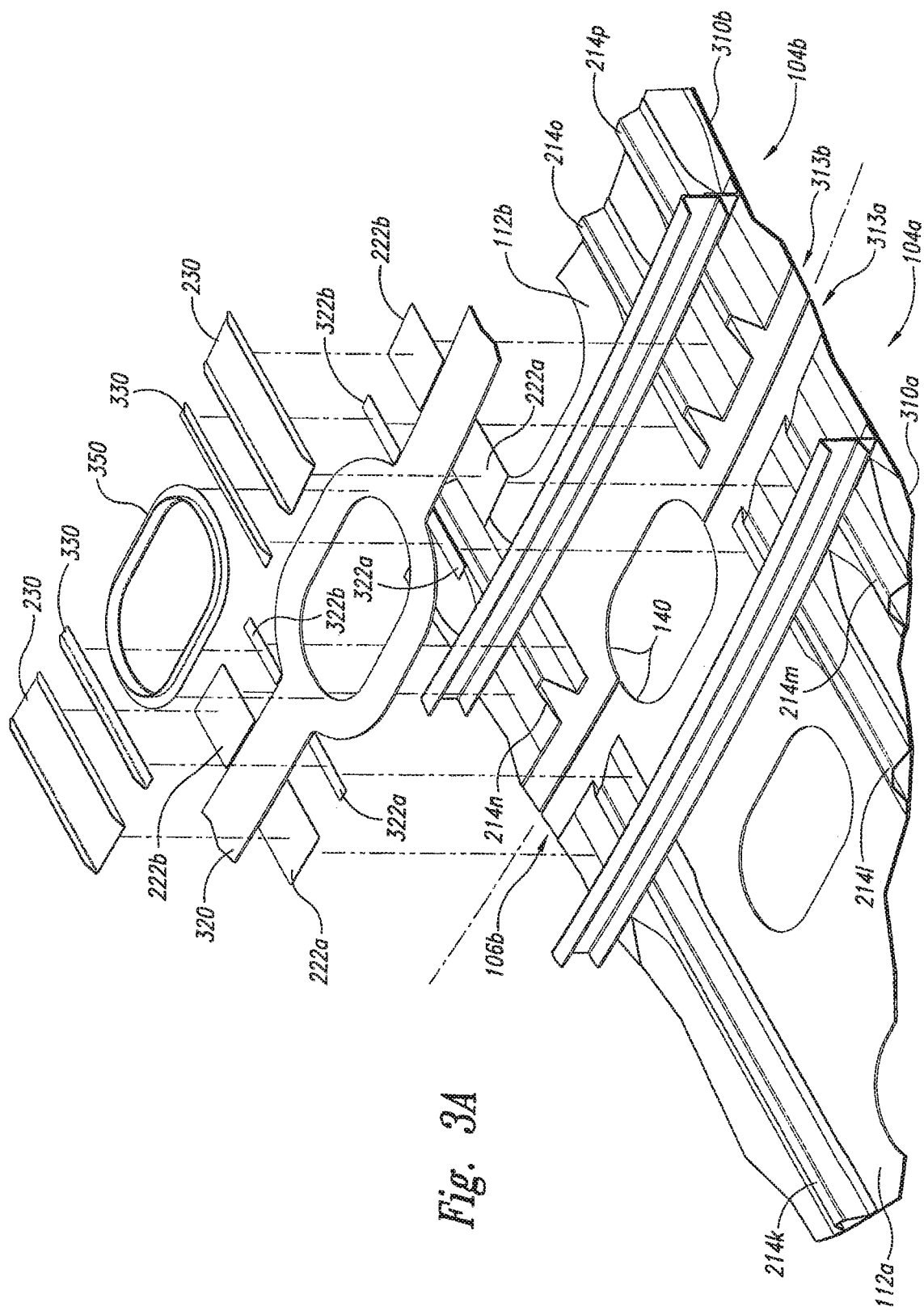

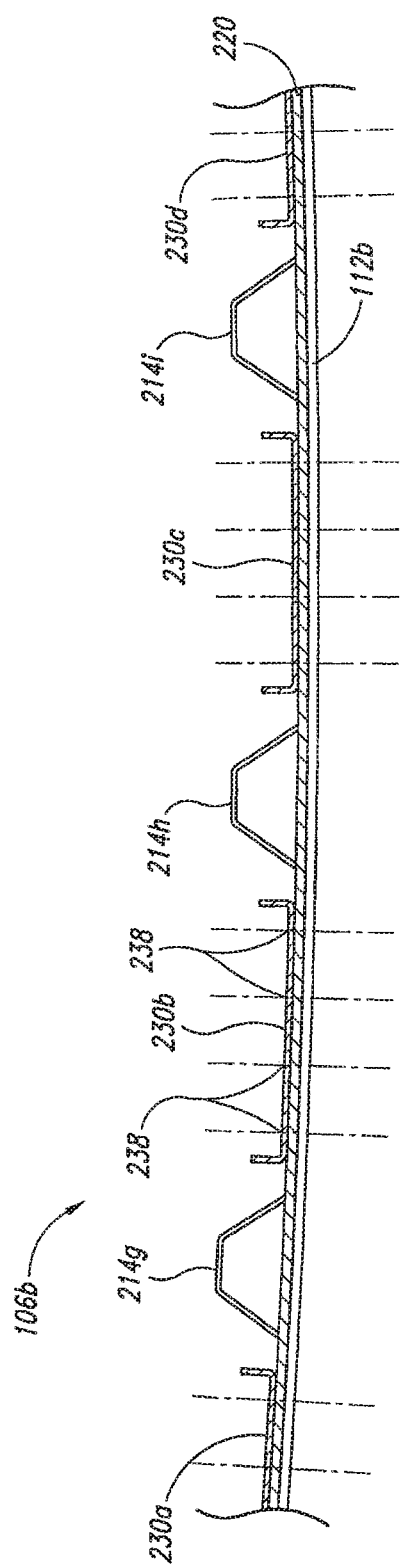

US 10,689,086 B2

SPLICE JOINTS FOR COMPOSITE AIRCRAFT FUSELAGES AND OTHER STRUCTURES

CROSS REFERENCE TO RELATED APPLICATIONS

This application is a divisional of U.S. patent application Ser. No. 14/525,218, filed Oct. 28, 2014, now issued as U.S. Pat. No. 9,738,371, which is a divisional of U.S. patent application Ser. No. 13/300,487, filed Nov. 18, 2011, now issued as U.S. Pat. No. 8,882,040, which is a divisional of U.S. patent application Ser. No. 12/016,258 filed Jan. 8, 2008, now issued as U.S. Pat. No. 8,061,035, and which is a divisional of U.S. patent application Ser. No. 10/949,848, now issued as U.S. Pat. No. 7,325,771, the entire disclosures of which are incorporated by reference herein.

TECHNICAL FIELD

The following disclosure relates generally to shell structures and, more particularly, to splice joints for joining composite fuselage sections and other shell structures together.

BACKGROUND

The primary structural elements of large passenger jets and other large aircraft are typically made from metal. Fuselage shells for such aircraft, for example, are typically manufactured from high-strength aluminum alloys or similar metals. In an effort to increase performance, however, many aircraft manufacturers are turning to fiber-reinforced resin materials (i.e., "composite" materials) that have relatively high strength-to-weight ratios. Conventional composite materials typically include glass, carbon, or polyaramid fibers in a matrix of epoxy or another type of resin. The use of such materials for primary structures has mostly been limited to smaller aircraft, such as fighter aircraft, high-performance private aircraft, and business jets.

One known method for manufacturing business jet airframes with composite materials is employed by the Raytheon Aircraft Company of Wichita, Kans., to manufacture the Premier I and Hawker Horizon business jets. This method involves wrapping carbon fibers around a rotating mandrel with an automated fiber placement system. The mandrel provides the basic shape of a longitudinal fuselage section. The carbon fibers are preimpregnated with a thermoset epoxy resin, and are applied over the rotating mandrel in multiple plies to form an interior skin of the fuselage section. The interior skin is then covered with a layer of honeycomb core. The fiber placement system then applies additional plies of preimpregnated carbon fibers over the honeycomb core to form an exterior skin that results in a composite sandwich structure.

The Premier I fuselage includes two 360-degree sections formed in the foregoing manner. The Hawker Horizon fuselage includes three such sections formed in this manner. The two 70-inch diameter sections of the Premier I fuselage are riveted and then bonded together at a circumferential splice joint to form the complete fuselage structure. The much larger Hawker Horizon fuselage, with an 84-inch diameter, uses aluminum splice plates at two circumferential joints to join the three fuselage sections together into a complete structure.

To precisely install the aluminum splice plates on the Hawker Horizon fuselage, Raytheon created a special, automated splice machine. This machine aligns the three fuselage sections using a computer-aided laser alignment system, and then drills attachment holes through the aluminum splice plates and the underlying sandwich structure. The machine then probes each hole for size quality and records statistical process control data on each hole. The drill heads also apply sealant and install hi-shear fasteners in approximately 1,800 places along each of the splice joints. (See Raytheon Aircraft news release at http://www.beechcraft.de/presse/2000/100900b.htm entitled "RAYTHEON AIRCRAFT'S HAWKER HORIZON REACHES FUSELAGE MILESTONE," Oct. 9, 2000).

SUMMARY

The present invention is directed generally toward structures and methods for joining composite fuselage sections and other panel assemblies together. A shell structure configured in accordance with one aspect of the invention includes a first panel portion positioned adjacent to a second panel portion. The first panel portion can include a first stiffener attached to a first composite skin, and the second panel portion can include a second stiffener attached to a second composite skin. The shell structure can further include a fitting extending across a first edge region of the first panel portion and a second edge region of the second panel portion. A first end portion of the fitting can be attached to the first stiffener and the first composite skin, and a second end portion of the fitting can be attached to the second stiffener and the second composite skin, to join the first panel portion to the second panel portion.

A method for manufacturing a shell structure in accordance with another aspect of the invention includes attaching at least a first stiffener to a first composite skin, and attaching at least a second stiffener to a second composite skin. The method can further include positioning the first composite skin in edgewise alignment with the second composite skin, attaching a first end of a fitting to the first stiffener and the first composite skin, and attaching a second end of the fitting to the second stiffener and the second composite skin. In one embodiment, the method can additionally include attaching a strap to a first edge region of the first composite skin and an adjacent second edge region of the second composite skin to splice the first and second composite skins together before the fitting is attached.

BRIEF DESCRIPTION OF THE DRAWINGS

FIGS. 3A-3C together illustrate a method of joining the first fuselage barrel section to the second fuselage barrel section in the vicinity of a window cutout, in accordance with another embodiment of the invention.

FIG. 4 is a cross-sectional end view of the splice joint of FIG. 2C taken substantially along line 4-4 in FIG. 2C.

DETAILED DESCRIPTION

The following disclosure describes structures and methods for joining composite fuselage sections and other panel assemblies together. Certain details are set forth in the following description and in FIGS. 1-3C to provide a thorough understanding of various embodiments of the invention. Other details describing well-known structures and systems often associated with composite parts and related assembly techniques are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 106 is first introduced and discussed with reference to FIG. 1.

Figure 1:
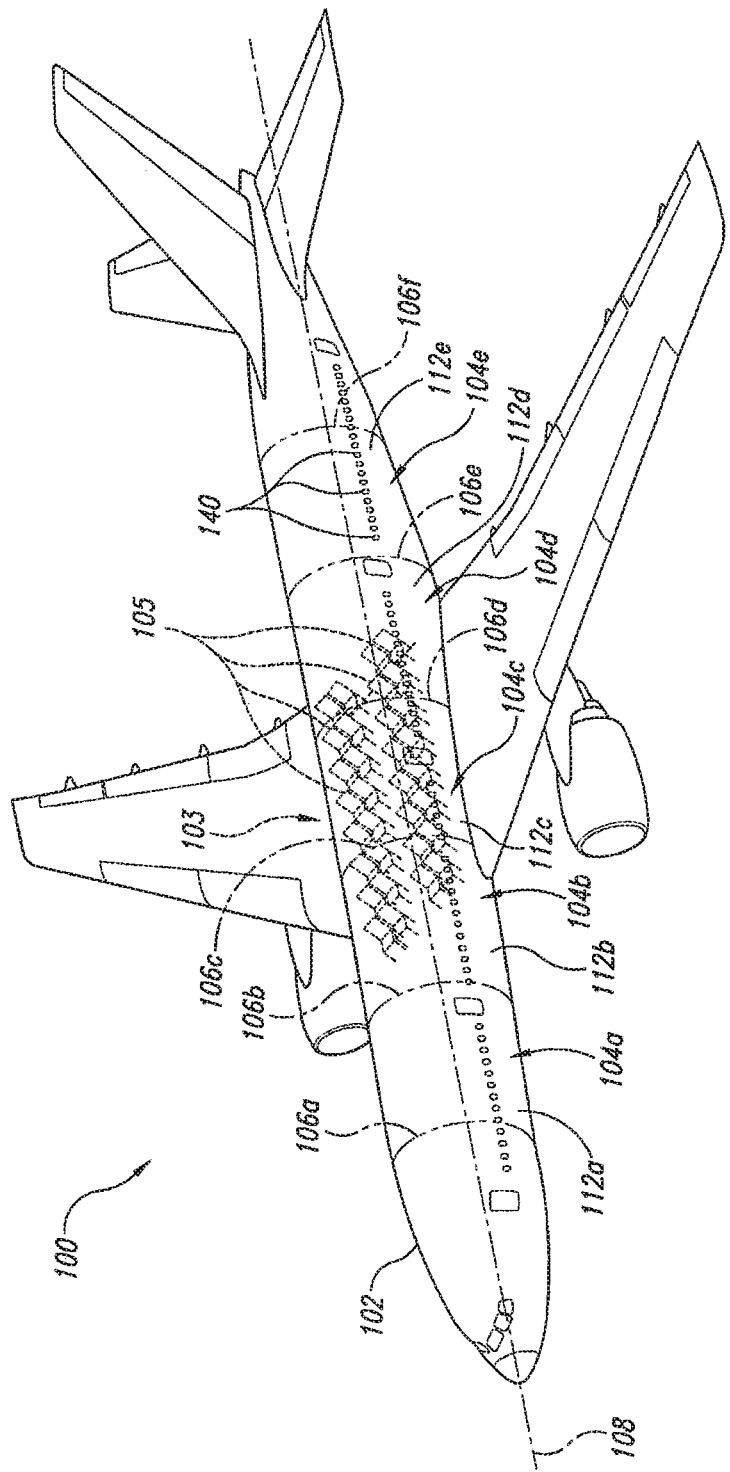
FIG. 1 is an isometric view of an aircraft having a composite fuselage configured in accordance with an embodiment of the invention.

FIG. 1 is an isometric view of an aircraft 100 having a composite fuselage 102 configured in accordance with an embodiment of the invention. In one aspect of this embodiment, the fuselage 102 includes a plurality of composite barrel sections 104 (identified individually as barrel sections 104a-e) joined together by a plurality of corresponding splice joints 106 (identified individually as splice joints 106a-f). Each of the barrel sections 104 includes a composite skin 112 (identified individually as composite skins 112a-112e) extending 360 degrees around a longitudinal axis 108. In the illustrated embodiment, each of the composite skins 112 can have a cross-sectional width of at least about 10 feet, such as about 15 feet to about 35 feet. In one embodiment, for example, the composite skins 112 can have a cross-sectional width of about 18 feet. Throughout this disclosure, the term "barrel section" is used for convenience to refer to any shell structure extending 360 degrees around an axis. Accordingly, the term is not limited to cylindrical structures or structures having barrel shapes, but can include structures having circular, elliptical, oval, egg-shaped, rectilinear, tapered, or other cross-sectional shapes. In addition, in one embodiment, the barrel sections 104 can be "one-piece" barrel sections in which the composite skins 112 are "one-piece" skins extending continuously for 360 degrees around the axis. In other embodiments, however, the skins 112 can be formed from two or more skin segments spliced or otherwise joined together to form the full 360-degree barrel section.

The fuselage 102 can further include a passenger cabin 103 configured to hold a plurality of passenger seats 105 ranging in number from about 50 to about 700 seats. For example, in the illustrated embodiment, the passenger cabin 103 can hold from about 150 to about 600 passenger seats 105. In other embodiments, the passenger cabin 103 can be configured to hold more or fewer passenger seats without departing from the spirit or scope of the present disclosure. Each of the barrel sections 104 can include a plurality of window cutouts 140 to provide the passengers seated in the passenger cabin 103 with views out of the aircraft 100.

Figure 2A:
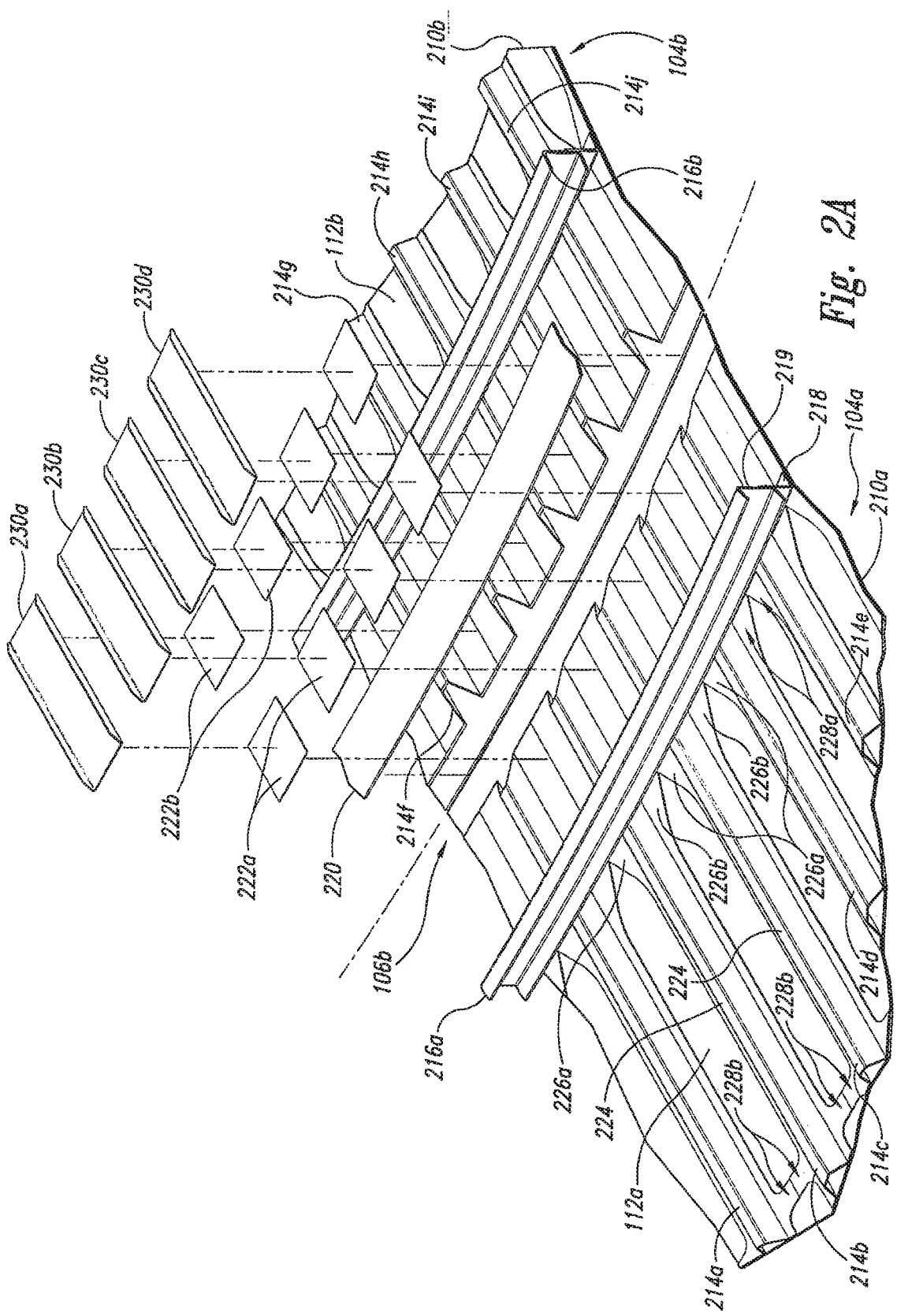
FIGS. 2A-2C together illustrate a method of joining a first fuselage barrel section to a second fuselage barrel section in accordance with an embodiment of the invention.
Figure 2B:
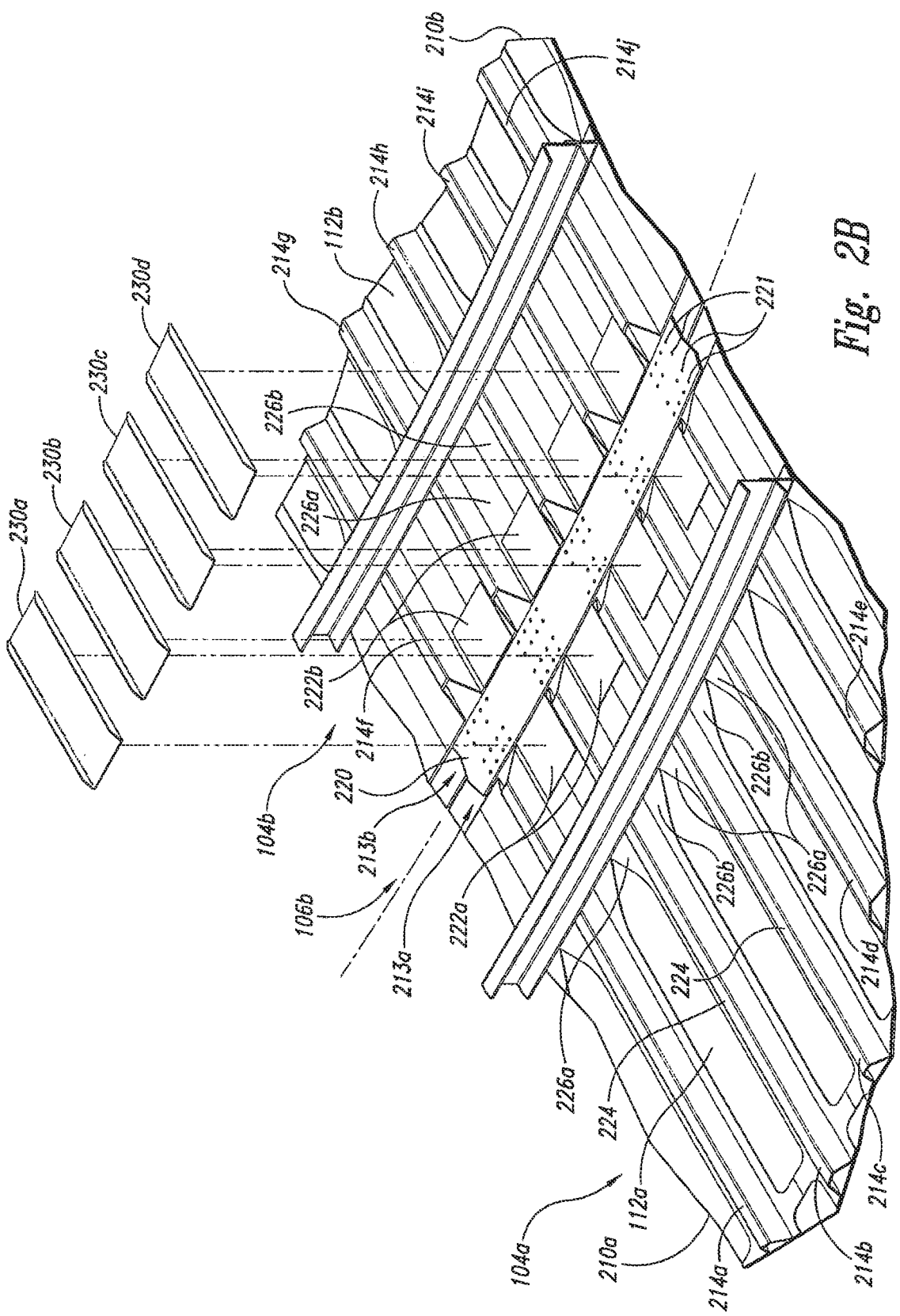
Figure 2C:
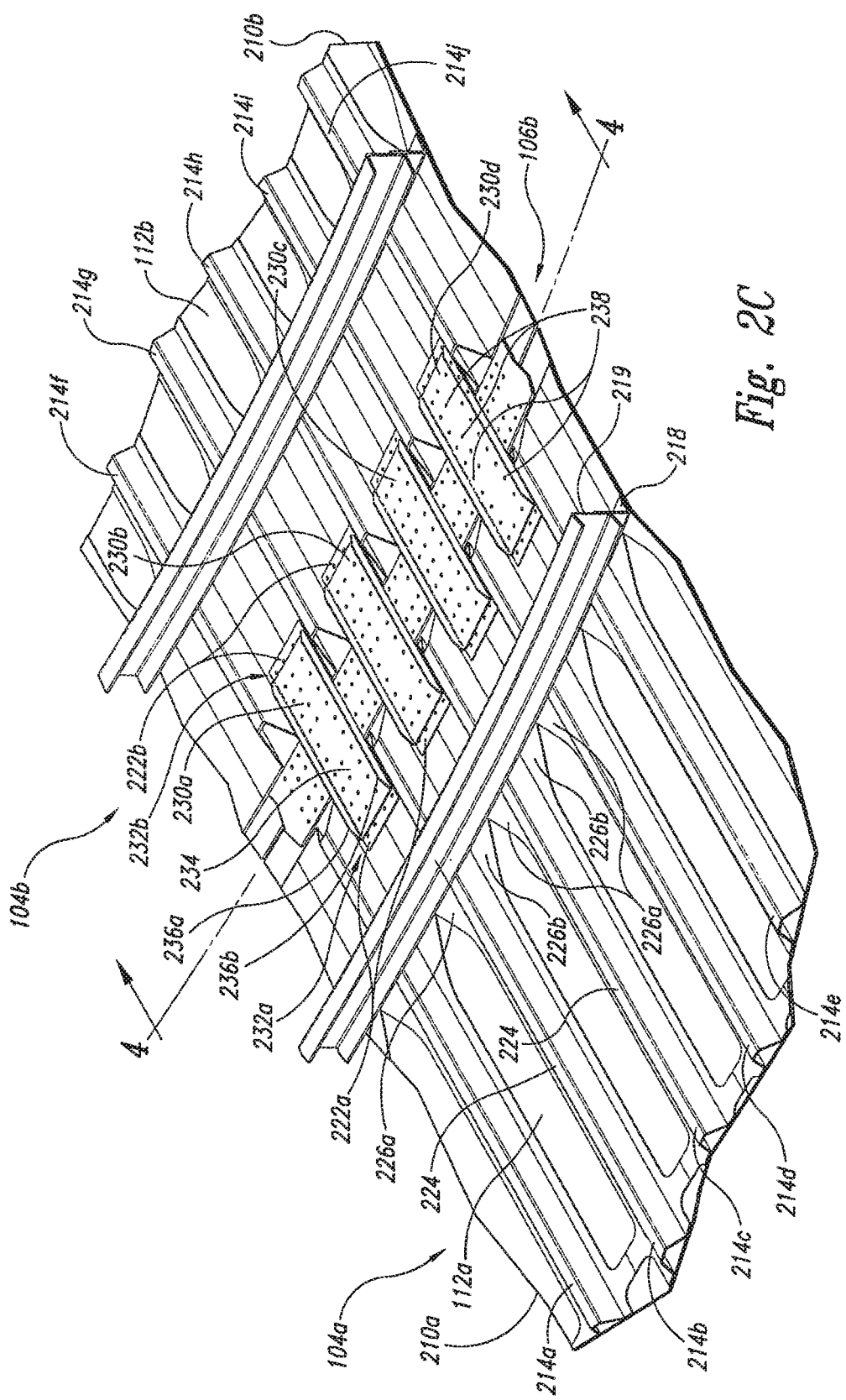

FIGS. 2A-2C together illustrate a method of joining the first barrel section 104a to the second barrel section 104b in accordance with an embodiment of the invention. Referring first to FIG. 2A, this view is a partially exploded, enlarged isometric view looking outwardly at a portion of the second splice joint 106b from within the fuselage 102 (FIG. 1). The portion of the first barrel section 104a illustrated in FIG. 2A includes a first panel portion 210a. The portion of the second barrel section 104b illustrated in FIG. 2A includes a second panel portion 210b positioned in edgewise alignment with the first panel portion 210a. In one embodiment, the panel portions 210 can be at least generally similar in structure and function to the panel assemblies described in detail in co-pending U.S. patent application Ser. No. 10/851,381, filed May 20, 2004, and Ser. No. 10/853,075, filed May 25, 2004, both of which are incorporated herein in their entireties by reference. For example, the first panel portion 210a can include a plurality of stiffeners 214 (identified individually as stiffeners 214a-214e) attached to the first skin 112a. Each of the stiffeners 214 can include a raised portion 224 projecting away from the first skin 112a, and a plurality of flange portions (identified individually as first flange portions 226a and second flange portions 226b) attached directly to the first skin 112a. In the illustrated embodiment, the stiffeners 214 have hat-shaped cross-sections. In other embodiments, however, the stiffeners 214 can have other cross-sectional shapes, including "L" shapes, "C" shapes, inverted "T" shapes, "I" shapes, etc. In yet other embodiments, the panel portions 210 can include other features, including those disclosed in co-pending U.S. patent application Ser. No. 10/819,084, filed Apr. 6, 2004, and incorporated herein in its entirety by reference.

The stiffeners 214 can be positioned on the first skin 112a so that the first flange portions 226a of one stiffener 214 are aligned with the corresponding second flange portions 226b of an adjacent stiffener 214. By aligning the flange portions 226 in the foregoing manner, the flange portions 226 can form a plurality of at least approximately continuous support surfaces 228 (identified individually as support surfaces 228a and 228b) extending between the raised portions 224 of the stiffeners 214.

The first panel portion 210a can further include part of a support member or frame 216a. In the illustrated embodiment, the frame 216a is a two-piece frame that includes a first frame section 218 and a second frame section 219. The first frame section 218 can be attached directly to the support surfaces 228 as described in detail in U.S. patent application Ser. No. 10/851,381. In other embodiments, the first frame section 218 can be attached to the first panel portion 210a using other methods. In still further embodiments, the first panel portion 210a can include parts of other frames composed of more or fewer frame sections. Alternatively, the frame 216a can be omitted.

The second panel portion 210b can be at least generally similar in structure and function to the first panel portion 210a described above. Accordingly, the second panel portion 210b can include a plurality of stiffeners 214 (identified individually as stiffeners 214f-j) attached to the second skin 112b. The second panel portion 210b can further include a second frame 216b that is attached to flange portions of the stiffeners 214 in the manner described above for the first panel portion 210a.

Referring next to FIG. 2B, an elongate strap 220 is attached to a first edge region 213a of the first skin 112a and an adjacent second edge region 213b of the second skin 112b to splice the first skin 112a to the second skin 112b. The strap 220 is attached to the inner side of the respective skins 112 to maintain a smooth, aerodynamic surface on the exterior of the fuselage 102 (FIG. 1). In one embodiment, the strap 220 can include composite materials, such as graphite-epoxy or similar material. In other embodiments, the strap 220 can include other materials, including metallic materials such as aluminum, titanium, steel, etc. The strap 220 can be attached to the skins 112 with a plurality of fasteners 221 extending through the strap 220 and the skins 112. In other embodiments, the strap 220 can be bonded to the skins 112, or bonded and fastened to the skins 112. Further, in embodiment, the strap 220 can extend continuously, or at least approximately continuously, around the splice joint 106b. In other embodiments, the strap 220 can be segmented around the splice joint 106b. For example, in one embodiment, the splice joint 106b can include six segments of the strap 220. In other embodiments, more (e.g., eight) or less segments of the strap 220 can be used.

In the illustrated embodiment, the strap 220 can be at least approximately as thick as the skins 112, but thicker than the adjacent flange portions 226 of the stiffeners 214. To avoid a step between adjacent surfaces, shim pads or fillers 222 (identified individually as first fillers 222a and second fillers 222b) are positioned on the flange portions 226 adjacent to the strap 220. In one embodiment, the fillers 222 can include composite materials, including graphite-epoxy or similar materials. In other embodiments, the fillers 222 can include aluminum and other metals. In yet other embodiments, the strap 220, the skins 112, and/or the flange portions 226 can have other relative thicknesses and/or the fillers 222 can be omitted.

Referring next to FIG. 2C, a plurality of fittings 230 are positioned on the strap 220 and extend across the splice joint 106b between the stiffeners 214. A first end portion 232a of each fitting 230 overlays the corresponding first filler 222a and the flange portions 226 of the adjacent stiffeners 214. Similarly, a second end portion 232b of each fitting 230 overlays the corresponding second filler 222b and the flange portions 226 of the adjacent stiffeners 214. In the illustrated embodiment, each of the fittings 230 has a channel or "U-shaped" cross section that includes a base portion 234, a first upstanding edge portion 236a positioned toward a first side of the base portion 234, and a second upstanding edge portion 236b positioned toward a second side of the base portion 234. In other embodiments, the fittings 230 can have other cross-sectional shapes, including "C" shapes, "L" shapes, inverted "Pi" shapes, and flat shapes, to name a few. A plurality of fasteners 238 extending through the fittings 230 and the underlying structures (i.e., the fillers 222, the flange portions 226, the strap 220, and the skins 112) attach the fittings 230 to the underlying structures to form a structural load path across the splice joint 106b.

The fittings 230, the stiffeners 214, the strap 220, and the skins 112 can include composite materials, including graphite-epoxy and/or other suitable composite materials. For example, in one embodiment, the skins 112 can be manufactured with toughened epoxy resin and carbon fibers, e.g., intermediate carbon fibers from Toray Composites America, Inc. of 19002 50th Avenue East, Tacoma, Wash. 98446. In this embodiment, the skins 112 can include fiber tape pre-impregnated with resin (i.e., "prepreg") and outer plies of prepreg fabric. In another embodiment, the strap 220 and the fittings 230 can also be manufactured from epoxy resin and carbon fibers. The skins 112, the strap 220, and the fittings 230 can have quasi-isotropic lay-ups, i.e., lay-ups having an equal (or approximately equal) number of plies with 0, +45, −45, and 90 degree orientations. The stiffeners 214 can have axial-dominated fiber orientations. In other embodiments, the skins 112, the strap 220, the fittings 230, and the stiffeners 214 can have other fiber orientations.

One advantage of using composite materials instead of metals is that the fittings 230 and the underlying structures (e.g., the skins 112 and the stiffeners 214) will have at least generally similar coefficients of thermal expansion. As a result, temperature fluctuations experienced during operation of the aircraft 100 (FIG. 1) will not cause disparate thermal expansion between the fittings 230 and the underlying structures, and hence will not induce significant stresses in the splice joint 106b. In other embodiments, however, the fittings 230 can include metal materials such as aluminum, titanium, steel, etc. The use of metals may be appropriate in those situations in which the aircraft is not expected to experience wide temperature fluctuations during operation.

In addition to composites and metal materials, in yet other embodiments, the skins 112, the strap 220, the fittings 230, and the stiffeners 214, and combinations thereof, can include other materials, including hybrid materials such as fiber/metal laminates. Such laminates include fiberglass/aluminum laminates and titanium reinforced graphite laminates (Ti/Gr). One hybrid laminate that includes alternating layers of aluminum and fiberglass is referred to as "GLARE™." This laminate may offer better fatigue properties than conventional aluminum. A Ti/Gr laminate may offer weight advantages over conventional aluminum or graphite-epoxy, but this laminate may also be more expensive.

One feature of the splice joint 106b illustrated in FIG. 2C is that the fittings 230 overlap the strap 220. One advantage of this feature is that it provides a fail-safe, redundant load path in the unlikely event that a crack or other structural flaw propagates through a portion of the strap 220. In such an event, the fittings 230 alone can carry the structural load across the splice joint 106b. In addition, the fittings 230 also provide a redundant load path across the splice joint 106b from where the stiffeners 214 terminate. Further, if a segmented strap 220 is used, then the fittings 230 can also be used as splice plates for adjacent strap segments. Another feature of the splice joint 106b is that the ends of the stiffeners 214 are left open. One advantage of this feature is that it enables moisture caused by condensation and other sources to escape the stiffeners 214 for sufficient drainage.

One feature of the fittings 230 of the illustrated embodiment are the first and second upstanding edge portions 236a and 236b. The upstanding edge portions 236 can add stiffness to the fittings 230, and can be positioned proximate to the raised portions 224 of the stiffeners 214. One advantage of this configuration is that it can increase the stability of the splice joint 106b, especially under compression loads.

Yet another feature of the illustrated embodiment is that the raised portions 224 of opposing stiffeners 214 are not spliced together across the splice joint 106b. One advantage of this feature is that it makes the fittings 230 relatively easy to install because the raised portions 224 do not have to be in perfect alignment. While the raised portions 224 could be spliced together in other embodiments, doing so would most likely add time and cost to manufacturing of the splice joint because of the various alignment and shimming considerations involved. Further, splicing the raised portions 224 together could close off the ends of the stiffeners 214, thereby preventing sufficient water drainage and preventing visual inspection of any fasteners positioned under the raised portions 224.

Although the splice joint 106b of the illustrated embodiment is built up from a number of separate parts (e.g., the strap 220 and the fittings 230), in other embodiments, two or more of these parts can be integrated into a single part that performs the function and/or has the features of the two or more parts. For example, in one other embodiment, the splice joint 106b can be at least partially formed by a single part that integrates the features of the strap 220 and the fittings 230. In another embodiment, the splice joint 106b can include a single part that integrates the features of the strap 220 and the adjacent fillers 222. Although integrating parts may have the advantages of reducing part count and/or increasing strength, using separate parts may have the advantage of simplifying part construction and/or simplifying installation procedures.

Figure 3B:
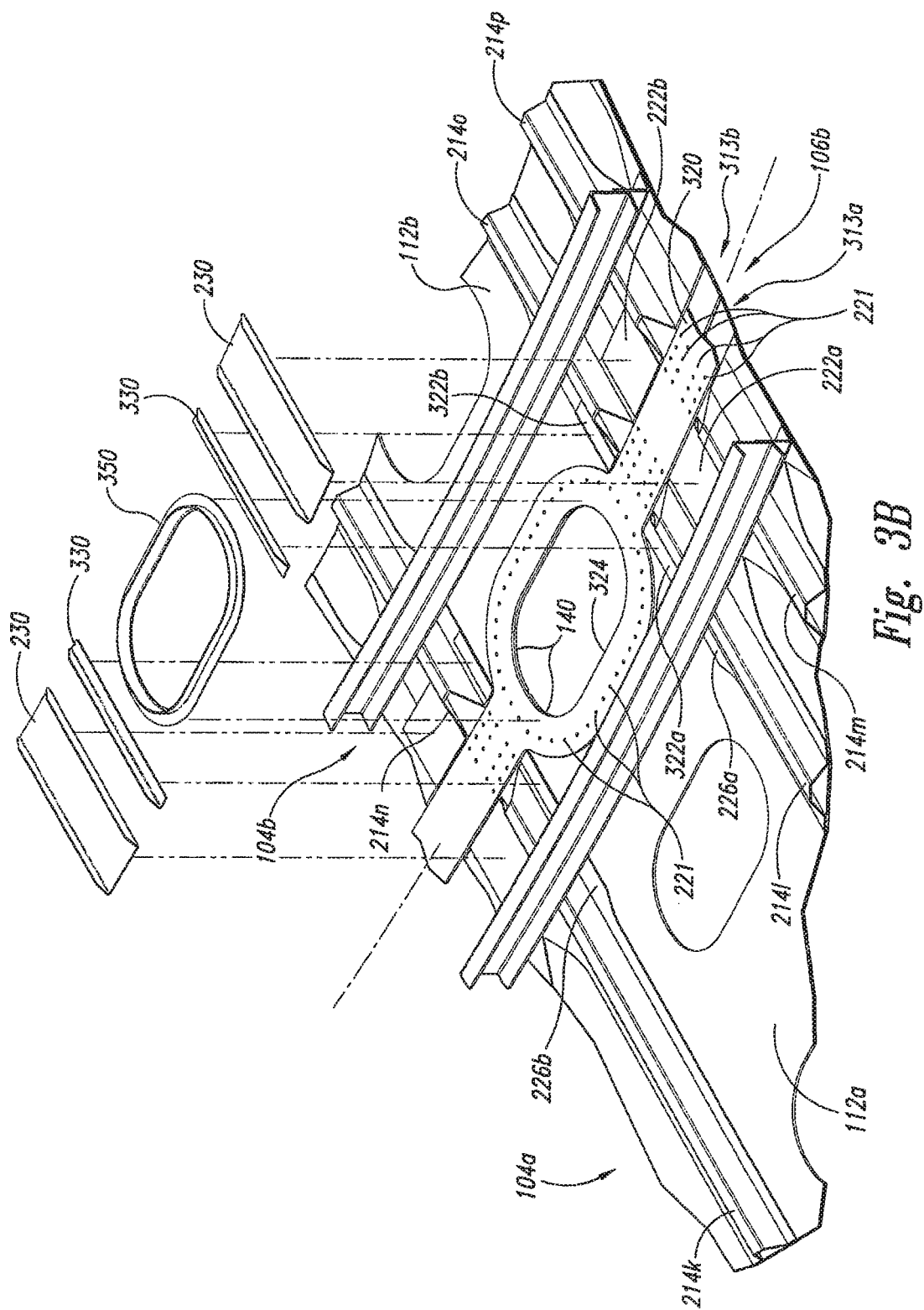
Figure 3C:
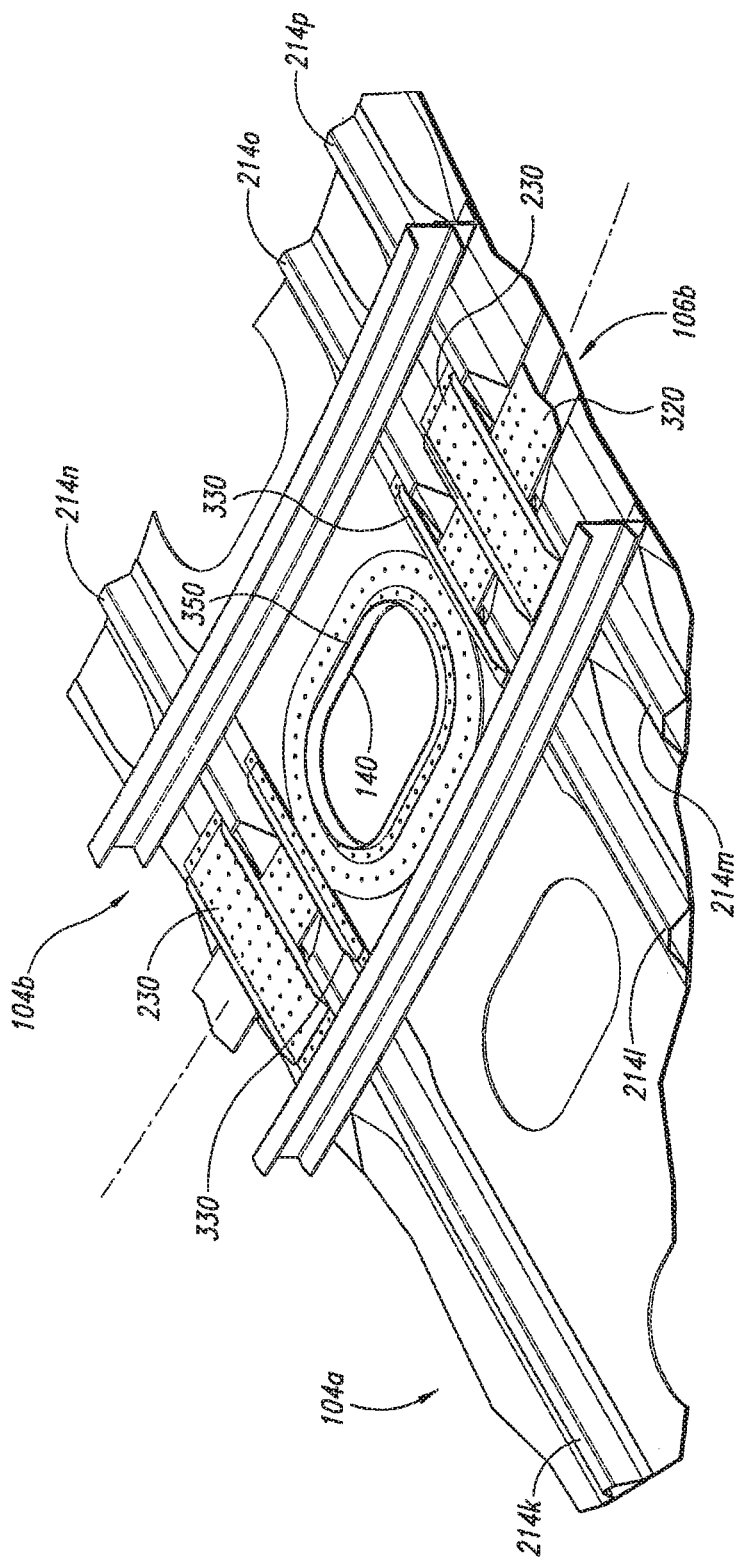

FIGS. 3A-3C together illustrate a method of joining the first barrel section 104a to the second barrel section 104b in the vicinity of one of the window cutouts 140, in accordance with an embodiment of the invention. Referring first to FIG. 3A, this view is a partially exploded, enlarged isometric view looking outwardly at a portion of the second splice joint 106b around the window cutout 140. The portion of the first barrel section 104a illustrated in FIG. 3A includes a third panel portion 310a. The portion of the second barrel section 104b illustrated in FIG. 3A includes a fourth panel portion 310b positioned in edgewise alignment with the third panel portion 310a. The panel portions 310 can be at least generally similar in structure and function to the panel portions 210 described in detail above with reference to FIGS. 2A-2C. For example, the third panel portion 310a can include a plurality of stiffeners 214 (identified individually as stiffeners 214k-214m) attached to the first skin 112a. Similarly, the fourth panel portion 310b can include a plurality of stiffeners 214 (identified individually as stiffeners 214n-214p) attached to the second skin 112b. In one aspect of the illustrated embodiment, however, the window cutout 140 is formed in a third edge region 313a of the first skin 112a, and in an adjacent fourth edge region 313b of the second skin 112b.

Referring next to FIG. 3B, an elongate strap 320 is attached to the third edge region 313a of the first skin 112a and the adjacent fourth edge region 313b of the second skin 112b. With the exception of an aperture 324 that extends through a flared-out portion of the strap 320, the strap 320 can be at least generally similar in structure and function to the strap 220 described above with reference to FIGS. 2A-2C. For installation, the aperture 324 is aligned with the window cutout 140 and the strap 320 is attached to the skins 112 with a plurality of the fasteners 221. In other embodiments, the strap 320 can be bonded to the skins 112, or bonded and fastened to the skins 112.

One feature of the strap 320 is that the aperture 324 extends completely around the window cutout 140. One advantage of this feature is that the strap 320 acts as a one-piece doubler, thereby providing an efficient load path around the window cutout 140. A further advantage of this feature is that it reduces part count by combining the window doubler feature with the splice strap feature in a single, integrated part.

In the illustrated embodiment, the strap 320 is thicker than the adjacent flange portions 226 of the stiffeners 214. To avoid a step between adjacent surfaces, the first fillers 222a and the second fillers 222b are positioned on the flange portions 226 adjacent to the strap 320 in those portions of the splice joint 106b positioned away from the window cutout 140. Narrower fillers 322 (identified individually as third fillers 322a and fourth fillers 322b) are positioned on the stiffener flange portions 226 in those areas proximate to the window cutout 140.

Referring next to FIG. 3C, a plurality of the fittings 230 extend across the splice joint 106b in the stiffener bays away from the window cutout 140 as described above with reference to FIGS. 2A-2C. Narrower fittings 330 are attached across the splice joint 106b in similar fashion at opposing ends of the window cutout 140. The narrow fittings 330 of the illustrated embodiment have "L" shaped cross sections. In other embodiments, however, the narrower fittings 330 can have other cross sectional shapes, including "U" shapes, "C" shapes, and flat shapes. A window frame 350 can be fastened or otherwise attached to the strap 320 and any underlying structures around the window cutout 140. In one embodiment, the window frame 350 can be machined or otherwise formed from a high-strength metal material, such as aluminum. In other embodiments, the window frame 350 can include composites and/or other suitable materials.

One feature of the embodiments described above and illustrated in FIGS. 3A-3C is that the splice joint 106b extends through the middle of the window cutout 140. One advantage of this feature is that it provides design flexibility. For example, this feature allows window patterns and barrel section lengths to be selected irrespective of splice location. FIG. 4 is a cross-sectional end view of the splice joint 106b taken substantially along line 4-4 in FIG. 2C. This view illustrates that, in this embodiment, the fittings 230 are positioned over the strap 220, and the fasteners 238 extend through the fittings 230, the strap 220, and the skin 112b. This view further illustrates that the fittings 230 are positioned between, but proximate to, respective stiffeners 214.

The subject matter of copending U.S. patent application Ser. No. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; Ser. No. 10/717,030, entitled "METHOD OF TRANSFERRING LARGE UNCURED COMPOSITE LAMINATES," filed Nov. 18, 2003; Ser. No. 10/646,392, entitled "AUTOMATED COMPOSITE LAY-UP TO AN INTERNAL FUSELAGE MANDREL," filed Aug. 22, 2003; Ser. No. 10/630,594, entitled "COMPOSITE FUSELAGE MACHINE," filed Jul. 28, 2003; Ser. No. 10/646,316, entitled "UNIDIRECTIONAL, MULTI-HEAD FIBER PLACEMENT," filed Aug. 22, 2003; Ser. No. 10/301,949, entitled "PARALLEL CONFIGURATION COMPOSITE MATERIAL FABRICATOR," filed Nov. 22, 2002; Ser. No. 10/799,306, entitled "SYSTEMS AND METHODS ENABLING AUTOMATED RETURN TO AND/OR REPAIR OF DEFECTS WITH A MATERIAL PLACEMENT MACHINE," filed Mar. 12, 2004; Ser. No. 10/726,099, entitled "SYSTEMS AND METHODS FOR DETERMINING DEFECT CHARACTERISTICS OF A COMPOSITE STRUCTURE," filed Dec. 2, 2003; Ser. No. 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003; entitled "SYSTEMS AND METHODS FOR USING LIGHT TO INDICATE DEFECT LOCATIONS ON A COMPOSITE STRUCTURE," filed Apr. 12, 2004, is incorporated herein in its entirety by reference. In addition, the subject matter of U.S. Pat. No. 6,168,358 is also incorporated herein in its entirety by reference.

From the foregoing, it will be appreciated that specific embodiments of the invention have been described herein for purposes of illustration, but that various modifications may be made without deviating from the spirit and scope of the invention. For example, aspects described in the context of particular vehicles, such as aircraft, can equally apply to other vehicles, such as helicopters, rockets, watercraft, etc. Further, aspects described in the context of particular embodiments can be combined or eliminated in other embodiments. Accordingly, the invention is not limited, except as by the appended claims.

We claim:
1. A device comprising:
a circumferential joint having:
at least one splice plate overlapping panels, wherein:
the at least one splice plate has a first end portion and a second end portion; and
the first end portion and the second end portion extend into regions between stiffeners to connect the panels together; and
at least a first stiffener attached to a first skin having a first edge cut-out portion.
2. The device of claim 1, wherein the at least one splice plate is attached to portions of the stiffeners.
3. The device of claim 2, further comprising:
abutting panels wherein each abutting panel is stiffened with at least two longitudinal stiffeners.
4. The device of claim 3, further comprising:
at least a second stiffener attached to a second skin having a second edge cut-out portion.
5. The device of claim 4, further comprising:
the first skin in edgewise alignment with the second skin, whereby the first edge cut-out portion is at least approximately aligned with the second edge cut-out portion.
6. The device of claim 5, further comprising:
a first end of a fitting attached to the first stiffener and the first skin, and a second end of the fitting to the second stiffener and the second skin.
7. The device of claim 6, further comprising:
a strap attached to a first edge region of the first skin and a second edge region of the second skin to splice the first skin and the second skin together.
8. The device of claim 7, wherein the strap includes an aperture at least approximately aligned with the first edge cut-out portion and the second edge cut-out portion.
9. The device of claim 6, further comprising:
a strap attached to a first edge region of the first skin and a second edge region of the second skin to splice the first skin and the second skin together, wherein the strap includes an aperture at least approximately aligned with the first edge cut-out portion and the second edge cut-out portion, and the strap includes a sandwiched portion of the strap between the fitting and the first edge region of the first skin and the second edge region of the second skin.
10. The device of claim 6, wherein:
a first window cut-out portion is formed in a first edge region of the first skin.
11. The device of claim 10, wherein:
a second window cut-out portion is formed in a second edge region of the second skin.

12. The device of claim 11, further comprising:
a strap attached to the first edge region of the first skin and the second edge region of the second skin to splice the first skin and the second skin together, wherein the strap includes an aperture at least approximately aligned with the first window cut-out portion and the second window cut-out portion.
13. The device of claim 1, further comprising:
abutting panels wherein each abutting panel is stiffened with at least two longitudinal stiffeners.
14. A device comprising:
a circumferential joint having:
at least one splice plate overlapping panels;
a first end portion and a second end portion, wherein the first end portion and the second end portion extend into regions between stiffeners to connect the panels together;
at least a first stiffener attached to a first skin having a first edge cut-out portion; and
abutting panels wherein each abutting panel is stiffened with at least two longitudinal stiffeners.
15. The device of claim 14, further comprising:
at least a second stiffener attached to a second skin having a second edge cut-out portion.
16. The device of claim 15, further comprising:
the first skin in edgewise alignment with the second skin, whereby the first edge cut-out portion is at least approximately aligned with the second edge cut-out portion.
17. A device comprising:
a circumferential joint having:
at least one splice plate overlapping panels;
a first end portion and a second end portion, wherein the first end portion and the second end portion extend into regions between stiffeners to connect the panels together; and
at least a first stiffener attached to a first skin having a first edge cut-out portion, wherein the first skin is in edgewise alignment with a second skin, whereby a first edge cut-out portion is at least approximately aligned with a second edge cut-out portion.
18. The device of claim 17, further comprising:
a first end of a fitting attached to the first stiffener and the first skin, and a second end of the fitting to a second stiffener and the second skin.
19. The device of claim 18, further comprising:
a strap attached to a first edge region of the first skin and a second edge region of the second skin to splice the first skin and the second skin together.
20. The device of claim 19, wherein the strap includes an aperture at least approximately aligned with the first edge cut-out portion and the second edge cut-out portion.

* * * * *